US011076611B2

(12) United States Patent
Favre et al.

(10) Patent No.: US 11,076,611 B2
(45) Date of Patent: Aug. 3, 2021

(54) PROCESS FOR MANUFACTURING A CHEESE PRODUCT AND CHEESE PRODUCT WITH REDUCED FAT CONTENT

(71) Applicant: BEL, Suresnes (FR)

(72) Inventors: Jean Favre, Rahay (FR); Claude Lemoine, Vendome (FR); Christian Le Dreff, Roce (FR)

(73) Assignee: BEL, Suresnes (FR)

( * ) Notice: Subject to any disclaimer, the term of this patent is extended or adjusted under 35 U.S.C. 154(b) by 56 days.

(21) Appl. No.: 16/478,720

(22) PCT Filed: Jan. 18, 2018

(86) PCT No.: PCT/EP2018/051183
§ 371 (c)(1),
(2) Date: Jul. 17, 2019

(87) PCT Pub. No.: WO2018/134293
PCT Pub. Date: Jul. 26, 2018

(65) Prior Publication Data
US 2019/0373908 A1 Dec. 12, 2019

(30) Foreign Application Priority Data

Jan. 18, 2017 (FR) ...................... 1750364

(51) Int. Cl.
*A23C 20/00* (2006.01)
(52) U.S. Cl.
CPC .......... *A23C 20/00* (2013.01); *A23C 2250/10* (2013.01)
(58) Field of Classification Search
CPC ................................................. A23C 2250/10
USPC ......................................................... 426/36
See application file for complete search history.

(56) References Cited

U.S. PATENT DOCUMENTS

| 5,064,660 A | 11/1991 | Silver |
| 6,348,228 B1 * | 2/2002 | Schotel ................. A23L 29/244 426/603 |
| 2005/0238783 A1 | 10/2005 | Han et al. |
| 2010/0330232 A1 * | 12/2010 | Thorsen ............. A23C 19/0973 426/38 |

FOREIGN PATENT DOCUMENTS

| EP | 2175739 | 4/2010 |
| FR | 2911044 A1 | 7/2008 |
| WO | 2006/030128 A1 | 3/2006 |
| WO | 2008/151820 A1 | 12/2008 |

OTHER PUBLICATIONS

French Search Report dated Jul. 5, 2017 in French Application 1750364.
International Search Report dated Mar. 8, 2018 in PCT/EP2018/051183.

* cited by examiner

*Primary Examiner* — Brent T O'Hern
(74) *Attorney, Agent, or Firm* — Nixon & Vanderhye

(57) ABSTRACT

Disclosed is to a process for manufacturing a cheese product whose fat content is less than or equal to 5% by weight relative to the total weight of the cheese product, having a moisture of the fat-reduced cheese product of 60 to 75% by weight of the total weight of the cheese product. Also disclosed is a cheese product having a moisture of the fat-reduced cheese product of 60 to 75% of the total weight of the cheese product and including at least one protein material in an amount sufficient for the protein content to represent 10 to 35%, the material protein including at least one protein material of dairy origin, at most 5% of fat and supplemental water up to 100%.

11 Claims, 7 Drawing Sheets

Figure 1:
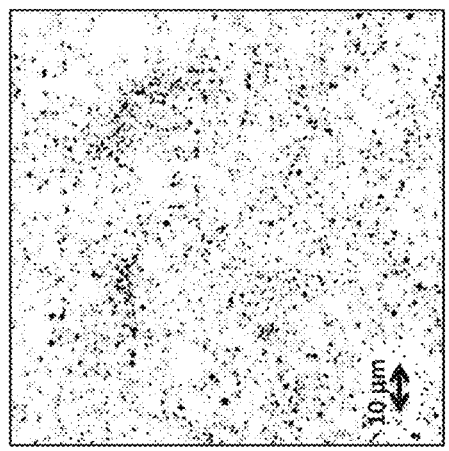

PROCESS FOR MANUFACTURING A CHEESE PRODUCT AND CHEESE PRODUCT WITH REDUCED FAT CONTENT

The present invention relates to a method for manufacturing a cheese product whose fat content is less than or equal to 5% by weight relative to the total weight of the cheese product, having a moisture content on the fat-free basis (MFFB) of 60 to 75% by weight relative to the total weight of the cheese product. The present invention also relates to a cheese product having a moisture content on the fat-free basis (MFFB) of 60 to 75% by weight relative to the total weight of the cheese product and comprising at least one protein material in an amount sufficient for the protein content to represent 10 to 35%, said material protein comprising at least one dairy-derived protein material, at most 5% of fat, and supplemental water up to 100%.

Many industrial methods for making low-fat cheeses are known. However, defects in texture and appearance (translucent or grayish for soft cheese and pressed cheese) are directly caused by a low fat content. To remedy these defects it is essential to add texturizing agents such as hydrocolloids (carrageenan, guar gum or carob).

Another category of industrial methods for making low-fat cheese is known. These methods involve a step of coagulation of skimmed or semi-skimmed milk with a coagulant or rennet (renneting) to coagulate the milk, then cutting the coagulum, curd/serum separation, and molding. These methods make it possible to obtain cheese products comprising between 10 and 15% fat. However, these values are still too high to claim a real nutritional advantage over market benchmarks. These methods do not make it possible to further lower the level of fat without damaging the organoleptic properties of the cheeses.

Methods for the manufacture of cheeses (specialty cheese) from milk powder, retentates (milk concentrates) obtained by ultrafiltration are also known. These methods are fast and make it possible to obtain cheese in only a few steps: mixing of the milk powder with water, acid solutions and fats, possible addition of enzymes, heating of the mixture thus obtained, the addition of various additives. These technologies as described in WO 2006/030128 and EP2175739 mainly use recombination to produce cheeses from powdered milk protein concentrates and butter. These methods are generally used to make fresh, melted or refined cheeses.

In the context of the new nutritional policies aimed at reducing the fat intake of consumers to fight against obesity (especially childhood obesity) and in the context of the adoption of food policies promoting healthy foods, the manufacture of cheese products with a very low fat content is highly sought after. However, making cheese products with a very low fat content and good organoleptic qualities (texture, appearance, taste) without additives/texturizing agents is extremely difficult.

Commercial low-fat pressed cheese products obtained by traditional technologies, such as WeightWatchers® slices (10% fat), Low-fat Les Croisés (14% fat) or low-fat Leerdammer® (17% fat) have fat contents greater than or equal to 5% by weight relative to the total weight of the cheese product. In ultrafiltration technology, it is the same for low-fat commercial cheese products such as low-fat Pavë d'Affinois (soft type) containing 9% fat by weight relative to the total weight of the cheese product.

The cheese products obtained by the method according to the invention also differ from the cheese products obtained by the method of patent FR2911044, in that the distribution of the fat, and more precisely of the fat globules, is more homogeneous and more stable, the whiteness is superior and therefore more attractive to the consumer, the packaging possibilities are much greater, and the room for maneuver is also greater in terms of texture and associated tastes, which are not limited by a restructuring process.

Thus, the technical problem to be solved by the present invention consists in obtaining cheese products with a fat content (at most 5%) having rheological and organoleptic characteristics appreciated by consumers.

Method for Manufacturing a Cheese Product with a Very Low Fat Content

The invention thus relates to a method for manufacturing a cheese product whose fat content is less than or equal to 5% by weight relative to the total weight of the cheese product, said cheese product having a moisture content on the fat-free basis (MFFB) of 60 to 75%, said method comprising the following steps:

a) in a mixing or recombination device, mixing and heating at a temperature of 40 to 85° C., with a shear of 5,000 to 40,000 s$^{-1}$, advantageously 15,000 to 25,000 s$^{-1}$, a mixture comprising water, and at least one protein material in sufficient quantity for the protein content to represent 10 to 35% by weight relative to the total weight of the mixture, said protein material comprising at least one dairy-derived protein material, the mixture comprising at most 5% fat by weight relative to the total weight of the mixture, in order to obtain a homogeneous mixture;

b) thermising the mixture by heating, then cooling it;

c) injecting into the mixture at least one coagulating agent;

d) dosing the mixture containing the coagulant into molds;

e) coagulating between 15 and 50° C.;

f) cooling down; and g) packaging the cheese product.

In one embodiment of the invention, the method of manufacturing a cheese product whose fat content is less than or equal to 5% by weight relative to the total weight of the cheese product, and said cheese product having a moisture content on the fat-free basis (MFFB) of 60 to 75%, said method comprising the following successive steps:

a) in a mixing or recombination device, mixing and heating at a temperature of 40 to 85° C., with a shear of 5,000 to 40,000 s$^{-1}$, advantageously 15,000 to 25,000 s$^{-1}$, a mixture comprising water, and at least one protein material in sufficient quantity so that the protein content represents 10 to 35% by weight relative to the total weight of the mixture, said protein material comprising at least one dairy-derived protein material, the mixture comprising at most 5% fat by weight relative to the total weight of the mixture, in order to obtain a homogeneous mixture;

b) thermizing the mixture by heating, then cooling it;

c) injecting into the mixture at least one coagulating agent;

d) dosing the mixture containing the coagulant into molds;

e) coagulating between 15 and 50° C.;

f) cooling down; and g) packaging the cheese product.

By "cheese product" is meant here any product obtained by coagulation, fermented or not, refined or not, mainly obtained from materials of dairy origin, which may include raw materials of plant origin, for example vegetable material, fat, and water. The cheese product may however contain in small amounts, coagulating agent, manufacturing auxiliary(ies), flavor(s), dye(s), preservative(s), but is preferably free of texturizing agents. The dry matter content (dry extract) of the cheese products is typically 25 to 60% by weight relative to the total weight of the cheese product.

According to one embodiment, the coagulation is carried out enzymatically.

According to a particular embodiment, the cheese product is of the pressed cheese type.

FAO/WHO standard No. A6-1978 proposes a classification of cheese products according to their moisture content on the fat-free basis (MFFB). Cheese products with an HFD between 54 and 63% may be called semi-hard cheese products, cheese products with an HFD between 61 and 69% may be called semi-soft cheese products, while cheese products with an HFD greater than 67% may be called soft cheese products.

Typically, the HFD is calculated as follows: (Weight of water in cheese)×100/(Total weight of cheese−Weight of fat in cheese).

In the context of the present invention, the term "pressed cheese product" is understood to mean a cheese product with an HFD between 60 and 65%, which corresponds to a semi-soft cheese product according to the FAO/WHO standard No. A6-1978. The pressed cheese product of according to the invention typically has a dry extract between 45 and 60% by weight relative to the total weight of the cheese product.

Composition of the Mixture

The method according to the invention comprises introduction into a mixing device or recombination of a mixture comprising water and at least one protein material, said protein material comprising at least one milk protein material, the mixture comprising at most 5% fat by weight relative to the total weight of the mixture. This mixture may further comprise salt (NaCl).

The protein material may be selected, but not limited to, the group consisting of dairy-derived protein materials, plant protein materials, and a mixture of these protein materials.

The dairy-derived protein material may be selected, in a non-limiting manner, from the group consisting of whole milk powders, skimmed milk powders, caseins, caseinates, dairy protein concentrates, serum protein concentrates, fresh or refined cheeses, curds, yogurts, fermented milks, and a mixture of these dairy-derived protein materials.

All of these raw materials are well known to those skilled in the art and are widely available on the world market. Among these may be mentioned products sold by Fonterra, Arla Foods. Their manufacturing technology is also described in Vignola C.: *Science and Technology of Milk Ed Polytechnique of Montreal* 2002.

In a preferred embodiment, the dairy-derived protein material is exclusively in powder form.

Very advantageously, the dairy-derived protein material is depleted in lactose (a lactose limiting concentration to stop fermentative acidification) to give the product better organoleptic properties. In particular, the dairy-derived protein material according to the invention has a lactose content of less than 15%, advantageously less than 12%, and preferably less than 6% by weight relative to the total weight of the mixture of step a).

Lactose is a carbohydrate naturally present in milk (from 20 to 80 g/L). It is a diholoside (or disaccharide), composed of a molecule of β-D-galactose (Gal) and a molecule of α/β-D-glucose (Glc) linked together by a β-linked osidic bond (1→4). Lactose is also called β-D-galactopyranosyl (1→4)D-glucopyranose. It may be symbolized by Gal β (1→4) Glc.

The plant-derived protein material may be selected, in a non-limiting manner, from the group consisting of proteins derived from cereals, oleaginous plants, legumes and tubers, as well as all the proteins derived from algae and microalgae, used alone or in a mixture, and a mixture of these plant-derived proteins.

By "algae" and "microalgae" is meant in the present application eukaryotic organisms lacking root, stem and leaf, but possessing chlorophyll and other pigments accessory to photosynthesis producing oxygen. They are blue, red, yellow, golden and brown or green.

Microalgae in the strict sense are microscopic algae. Undifferentiated unicellular or multicellular, they are photosynthetic microorganisms separated into two polyphyletic groups: eukaryotes and prokaryotes. Living in highly aqueous media, they may have flagellar mobility.

By "cereals" is meant in the present application cultivated plants of the family of grasses producing edible grains, such as, for example, wheat, oats, rye, barley, maize, sorghum, rice. Cereals are often ground in the form of flour, but are also in the form of grains and sometimes in the form of whole plants (fodder).

By "tubers" is meant in the present application all the reserve organs, generally underground, which ensure the survival of plants during the winter season and often their vegetative propagation. These organs are swollen by the accumulation of reserve substances. The organs transformed into tubers may be:

the root: carrot, parsnip, cassava, konjac,
the rhizome: potato, Jerusalem artichoke, crosne of Japan, sweet potato, the base of the stem (more precisely the hypocotyl): kohlrabi, celery root,
the whole root and hypocotyl: beet, radish.

In the present application, "oleaginous" is understood to mean plants grown specifically for their seeds or their high-fat fruits, from which oil is extracted for food, energy or industrial use, such as, for example, soybean, rapeseed, rapeseed oil peanut, sunflower, sesame, castor.

In the present application, "legumes" is understood to mean all plants belonging to the caesalpiniaceae, mimosaceae or papilionaceae families, and, in particular, all plants belonging to the papilionaceae family, for example pea, bean, fava bean, tick beans, lentils, alfalfa, clover or lupine. This definition includes, in particular, all the plants described in any of the tables contained in the article by R. HOOVER et al., 1991 (HOOVER R. (1991) *"Composition, structure, functionality and chemical modification of vegetable starches: a review"* Can. J. Physiol Pharmacol., 69 pp. 79-92).

Proteins derived from legumes are, for example, selected from the group consisting of pea protein, alfalfa, clover, lupine, bean, fava bean, tick bean, lentil.

In one embodiment, the plant-derived protein material is selected from the group consisting of pea protein, soy protein, rice protein, wheat protein, and a mixture of these plant-derived protein materials.

In one embodiment, the mixture of step a) comprises protein material comprising at least one dairy protein material and at least one plant-derived protein material in an amount sufficient for the protein content in mixture to represent 10 to 35%, preferably 15 to 30%.

In a preferred embodiment, the mixture of step a) comprises dairy-derived protein material in an amount sufficient for the protein content in the mixture to represent 10 to 35%, preferably 15 to 30%.

Similarly, the mixture of step a) of the method according to the invention comprises at most 1 to 20% lactose and preferably 1 to 10% lactose, preferably 1 to 5% lactose by weight relative to the total weight of the mixture.

The mixture of step a) comprises at most 5% of fat by weight relative to the total weight of the mixture, for example from 0.15 to 5%, from 0.15 to 4%, or from 0, 15 to 3%, more particularly from 0.15 to 2%, or even from 0.15 to 1% fat by weight relative to the total weight of the mixture.

Generally, at least a portion of the fat is provided by the dairy-derived protein material. In fact, dairy-derived protein materials, even skimmed, generally contain a residual fat content of about 0.15% by weight relative to the weight of the dairy-derived protein material.

Step a) may comprise the addition of fat in a content of from 0.1 to less than 5.0% by weight relative to the total weight of the mixture, the total content of the fat mixture being 5% at most. The amount of fat added to the mixture is adapted according to the fat content of the dairy-derived protein material, so that the total weight of fat in the recombination mixture is 0.15 to 5% by weight relative to the total weight of the mixture, and especially from 0.15 to 4%, or else from 0.15 to 3%, more particularly from 0.15 to 2%, or even from 0.15 to 1%.

The method according to the invention thus makes it possible to obtain cheese products whose fat content by weight relative to the total weight of the cheese product is at most 5%, and especially from 0.15 to 5%, or else 0.15 to 4%, or else 0.15 to 3%, more particularly 0.15 to 2%, or even 0.15 to 1%.

The added fat may be of animal origin, plant origin or a mixture of fats of animal and plant origin, preferably the fat is of animal origin. Animal fats include milk fat, anhydrous milk fat, butter, cream. Plant fats include soybean oil, sunflower oil, palm oil, palm kernel oil, copra oil, peanut oil, rapeseed oil and any plant oil used in the manufacture of food products and available on the market.

The mixture may further comprise at least one manufacturing auxiliary.

Manufacturing auxiliaries are auxiliaries other than the coagulating agent and include, in particular, salt (typically: table salt, sea salt, brine, NaCl substitute), allowing adaptation to the palatability of the cheese product, and ferment-ripening cheeses (mesophilic and/or thermophilic fermentation agents, in particular bacteria of the genus *Lactobacillus* or *Streptococcus*). Manufacturing auxiliaries are not additives and therefore do not include melting salts, and texturizing agents including emulsifiers.

The salt content in the mixture is generally 1.3 to 1.7% by weight relative to the total weight of the mixture.

Water is present in the mixture in a sufficient amount up to 100% by weight. Generally, the water content in the mixture is 55 to 90%, for example 55 to 75%, 60 to 70%, or 60-65%, by weight relative to the total weight of the mixture. To constitute the mixture, when the mixture contains added fat, it is possible to add the water in the mixing device or recombination, then the added fat and finally the said at least one dairy-derived protein material. Alternatively, it is possible to add in the mixing device or recombination water, then the added fat, and finally said at least one dairy-derived protein material. The two modes of incorporation described above make it possible to ensure good emulsion of the mixture.

According to one embodiment, the mixture of step a) does not contain any other ingredients than said at least one dairy-derived protein material, water and optionally said at least one added fat and/or less a manufacturing auxiliary.

Mixing or Recombination

The mixing or recombination device is typically a cutter-type apparatus (for example those marketed under the name STEPHAN®) or apparatus of the kneader, mixer, kneader, cooker-mixer, co-kneader or extruder type. It is specified that shears of 5000 to 40,000 and a stirring speed of the order of 1500 rpm typically correspond to the shear of known recombination apparatuses.

The mixing or recombination time is thus typically at least 10, 15, 20, 25 or 30 min. The mixing or recombination time is also typically at most 2 h, 1 h30, or 1 h.

The duration and intensity of shear during mixing or recombination are chosen so as to obtain small fat globules, the diameter of at least 50% of the globules being less than or equal to 1.5 µm, preferably less than 1 µm, and whose average diameter of the fat globules in the cheese product is less than or equal to 1.5 µm, preferably less than 1 µm.

The diameter and average diameter of the fat globules in the mixture are measured by particle size analysis.

The duration and intensity of shearing chosen during mixing or recombination thus make it possible to obtain a cheese product, characterized in that the diameter of at least 50% of the fat globules in the cheese product is less than or equal to 1.5 µm, preferably less than 1 µm, and in that the average diameter of the fat globules in the cheese product is less than or equal to 1.5 µm, preferably less than 1 µm.

The diameter and average diameter of the fat globules in the cheese product are measured by confocal laser scanning microscopy (CLSM).

By fat globule is meant here a rounded or oval shaped structure, composed solely of animal or plant fat material.

In comparison, cheese products obtained by traditional technology include fat globules with an average diameter greater than 3 µm and coalesced fat. The majority of the fat is no longer in the form of fat globules, they tend to undergo a phenomenon of coalescence.

In the context of the invention, the stability of these fat globules is obtained thanks to the presence of protein material in large quantity, which forms an interface on the surface of the fat globules and causes the formation of a homogeneous network within the mixture, then cheese product, through calcium bridging. The fat is thus not salted, and the cheese product obtained is stable over time. It has been shown that, after 6 months' ripening, the particle size of the fat cells of the products tested remained unchanged. The small size of the fat globules gives the mixture and the cheese product a white, not grayish, color which is an unwanted feature of many low fat cheese products.

Because of the formation of a homogeneous network within the mixture and then the cheese product, the cheese product has a more pleasant texture (more supple) than commercial fat-reduced cheese products whose texture is often chewy or brittle.

The diameters of the fat globules may be measured by conventional particle size techniques. The particle size measurement techniques are known to those skilled in the art, and include, for example, the laser particle size (when the product to be analyzed is able to flow) or particle analysis by confocal laser scanning microscopy (when the product to be analyzed is solid).

The laser granulometer measures small object sizes (0.1 µm to 2 mm). Its field of application is very wide and is suitable for wet particle analysis (suspension/emulsion in a solvent) and dry particle analysis (powder).

Confocal laser scanning microscopy allows, by attaching specific fluorescent markers (fluorochromes), the visualization of compounds of interest in the sample such as proteins or fat. This technique uses a laser, a unidirectional light source, which, at a given wavelength, will penetrate the product in the mass and collect structural information on an area of a plane of the sample, called the focal plane. The presence of a diaphragm makes it possible to block the emission of fluorescence coming from the other planes of the sample.

The mixing or recombination is carried out at a temperature of from 40 to 85° C., preferably from 50 to 75° C., more preferably from 60 to 70° C., and more preferably from 65 to 70° C., for at least 10 min, 20 min, 30 min, 40 min, 50 min or 60 min, preferably for at least 20 min.

The temperature of the mixture in the mixing or recombination device preferably remains lower than or equal to 70° C., the denaturation temperature of the serum proteins, beyond which the viscosity of the mixture would become too great.

Thermization and Cooling

The thermization is carried out by heating to a temperature of at least 65° C., preferably 70 to 80° C., preferably 72 to 95° C., more preferably 75° C., for at least 10 s, preferably for 10 to 60 s, for example for 50 s.

Thermization of the mixture is followed by cooling the mixture to a temperature suitable for the development of lactic ferments of cheese products, up to the temperature of the oven in which coagulation will be started. Advantageously, the mixture is cooled to a temperature of 15 to 50 C, preferably 20 to 43° C.

Injection

At least one coagulating agent is then injected into the thermized mixture and then cooled.

By coagulating agent is meant a proteolytic enzyme for coagulation of proteins, particularly milk proteins and the formation of a curd. For example, rennet may be used. Typically, 1 to 50 g of coagulating agent with a force of 750 International Milk Clotting Units (IMCU) are used per 100 kg of mixture. Advantageously, the step of injecting at least one coagulating agent further comprises the injection of one or more manufacturing auxiliaries. The manufacturing auxiliaries are auxiliaries other than the coagulating agent and include, in particular, salt (typically: table salt, sea salt, brine, NaCl substitute, allowing adaptation of the flavor of the product) and the cheese refining ferments (mesophilic and/or thermophilic fermentation agents, in particular bacteria of the genus *Lactobacillus* or *Streptococcus*). Manufacturing auxiliaries are not additives and therefore do not include melting salts, and texturizing agents including emulsifiers. The manufacturing auxiliaries are preferably injected into the thermized mixture and then cooled before the injection of the coagulating agent.

Optionally, salt may be added to the mixture in sufficient quantity so that the content in the mixture represents 1.3 to 1.7% by weight relative to the total weight of the mixture. The salt injection is carried out, in particular, when the mixture of step a) has not incorporated salt or when the method does not include a brining step.

According to one embodiment, the step of injecting at least one coagulating agent, and advantageously one or more manufacturing auxiliaries, further comprises the injection of one or more additives.

"Additive" is understood to mean any substance which is not normally consumed as a food in itself and is not normally used as a characteristic ingredient of a food, whether or not it has nutritional value, and including intentional addition to the food for technological or organoleptic purposes at any stage of the manufacture, processing, preparation, packaging, transport or storage of the food product, that may cause or may result (directly or indirectly) in its incorporation or that of its derivatives into the product, or may otherwise affect the characteristics of the food (definition in accordance with Codex Standard Stan 192-1995 of the Codex *Alimentarius*). Mention may be made, for example, of melting salts, texturizing agents (emulsifiers, thickeners), preservatives, enhancers, acidifiers, antioxidants and dyes. The term does not apply to contaminants, substances added to foods for the purpose of maintaining or improving their nutritional properties, or to sodium chloride and ferments.

EU Regulation No. 1129/2011 of 11 Nov. 2011 contains in Part B of Annex II an exhaustive list of permitted additives in the European Union, including dyes, preservatives and texturizing agents.

By "aromas" are means herein aromas, flavoring substances, flavoring preparations, aromas obtained by heat treatment, smoke flavorings and flavor precursors as defined in Regulation (EC) No 1334/2008 of 16 Dec. 2008, which contains in Annex I an exhaustive list of aromas authorized in the European Union.

In one embodiment of the invention, the method does not include the use of any additive selected from melting salts and texturizing agents (emulsifiers and thickeners).

In one embodiment, the method comprises injecting dye(s), flavor(s) and/or preservative(s). Preferably, according to this embodiment, the method does not include the use of any additive selected from melting salts and texturizing agents (emulsifiers and thickeners).

In order to optimize the nutritional value of the cheese product, an embodiment of the method according to the invention comprises the addition, in the thermized and then cooled mixture, of micronutrients, antioxidants, microalgae (such as, for example, *chlorella* and spirulins), vitamins (such as, for example, vitamin A, B, C and/or D), minerals (such as, for example: calcium, potassium, magnesium, zinc, iron, iodine, copper, selenium, manganese etc. . . . ), in soluble or insoluble forms. Preferably, according to this embodiment, the method does not include the use of any additive selected from melting salts and texturizing agents (emulsifiers and thickeners).

According to one embodiment of the invention, the taste and/or the appearance of the cheese product may be modulated by adding specific aroma(s) predominantly sweet (fruit, sugar, vanilla, etc. . . . ) or salty (cheese flavor), by the addition of spice(s), flavor(s), natural coloring(s), or formed element(s) (peppercorns, cumin, broken nuts, almonds, etc. . . . ), and their combination. Preferably, according to this embodiment, the method does not include the use of any additive selected from melting salts and texturizing agents (emulsifiers and thickeners).

"Formed elements" means elements that have a recognizable shape, texture, color, or taste within the cheese product. Examples of formed elements include garlic, parsley, pepper, shallot, caraway, nut chips, hazelnuts, olives, herbs, vegetable chips or fruits.

Dosage/Coagulation

The mixture injected with the coagulating agent and optionally further comprising one or more dyes, flavors and/or preservatives, one or more manufacturing auxiliaries, one or more additives and one or more micronutrients, antioxidants, microalgae, vitamins, minerals, flavor(s), spice(s), flavoring(s), natural dye(s), or formed element(s), is then injected into molds.

According to one embodiment, the molds allow the formation of mini-portions of 20 to 30 g of cheese product.

The mixture injected into the molds is then allowed to coagulate at a temperature of 15 to 50° C., preferably 20 to 43° C. The mixture injected into the molds is generally left in an oven for a period of between 10 min and 7 h.

According to one embodiment, the method comprises, after step e) of coagulation and before step f) of cooling, a step of brining so that the salt content in the cheese product represents 1.3 to 1.7% by weight relative to the total weight of the cheese product.

Advantageously, the method comprises a step of refining the cheese product, after the coagulation step e) and possibly after the brining step if it is implemented, but before the cooling step f). By refining is meant the phase comprising the acidification coagulation sequence in the presence, at least, of lactic ferments. The cheese products are then advantageously refined for a period of the order of 1 to 10 days, preferably 1 to 2 days, at a temperature of 25 to 35° C., up to a pH of specialties cheese typically of 4, 7 to 5.3 (especially 5.2 for pressed cheese).

A wide range of ripening ferments may be used; mention may be made of *Lactobacillus* and/or *Streptococcus* ferments and any ferment known to those skilled in the art at the origin of the formation of aromatic compounds characteristic of traditional cheese products. According to preferred embodiments, the ripening ferments are introduced at the same time as the coagulating agent, i.e. in step c), but they may also be introduced, for example, after coagulation in the case of ferments. participating in the cheese crust.

Cooling/Packaging

The cheese product is then packaged, preferably in the form of a paraffinic portion. For this purpose, the cheese product is previously cooled to a temperature below the coagulation temperature and between 4 and 20° C.

Alternatively, the cheese product may be packaged in another form of packaging, such as pot, tray, flexible bag, aluminum portion, pod, etc. Optionally, the cheese product is previously sliced.

Characteristics of the Cheese Product

The cheese product obtained by the method has a fat content of not more than 5% by weight relative to the total weight of the cheese product, a moisture content on the fat-free basis (MFFB) of between 60 and 75%, and comprises by weight relative to the total weight of the cheese product:
- 10 to 35%, preferably 15 to 30% of proteins;
- at most 5%, preferably 0.15% to 5%, more preferably 0.15% to 3%, more preferably still 0.15 to 2%, still more preferably 0.15 to 1.8%, or even 0, 15 to 1.5%, or even 0.15 to 1% fat; and
- supplemental water up to 100%.

According to one embodiment of the invention, the cheese product has a carbohydrate content of less than or equal to 5% by weight relative to the total weight of the cheese product, preferably less than or equal to 1%, advantageously less than or equal to 0.1% after lactic acidification.

The cheese product obtained may also comprise one or more manufacturing auxiliaries (in particular at least one salt), one or more additives including antioxidants, one or more micronutrients, microalgae, minerals, flavorings, at least one acid, for example lactic acid, and/or formed elements. Preferably, the cheese product does not comprise any additive chosen from melting salts and texturizing agents (emulsifiers and thickeners). According to this embodiment, the weight percentage represented cumulatively by the melting and texturing salts is less than 0.1%.

The cheese product obtained by the method according to the invention is characterized in that the diameter of at least 50% of the fat globules in the cheese product is less than or equal to 1.5 µm, preferably less than 1 µm, while the average diameter of the fat globules in the cheese product is less than or equal to 1.5 µm, preferably less than 1 µm.

The diameter and average diameter of the fat globules in the cheese product are measured by confocal laser scanning microscopy (CLSM).

The diameter and average diameter of the fat globules in the cheese product are typically obtained by making a mixture in step a), characterized in that the diameter of at least 50% of the fat globules in the mixture is less than or equal to 1.5 µm, preferably less than 1 µm, and in that the average diameter of the fat globules in the cheese product is less than or equal to 1.5 µm, preferably less than 1 µm.

The diameter and average diameter of the fat globules in the mixture are measured by particle size analysis.

In general, the cheese product obtained by the method according to the invention has the characteristics of a cheese product as described below.

Cheese Product

The invention also relates to a cheese product having a moisture content on the fat-free basis (MFFB) of between 60 and 75%, and comprising, by weight relative to the total weight of the cheese product:
- 10 to 35%, preferably 15 to 30% of proteins;
- at most 5%, preferably 0.15% to 5%, more preferably 0.15% to 3%, more preferably still 0.15 to 2%, still more preferably 0.15 to 1.8%, or even 0.15 to 1.5%, or even 0.15 to 1% fat; and
- supplemental water up to 100%.

In one embodiment of the invention, the cheese product does not comprise any additive chosen from melting salts and texturizing agents (emulsifiers and thickeners). The weight percentage represented cumulatively by the melting and texturizing salts is then less than 0.1%.

In one embodiment, the product comprises dye(s), aroma(s) (especially specific predominantly sweet flavors (fruit, sugar, vanilla, etc. . . . ) or salty (cheese flavor), spices, seasonings) and/or preservative(s). Preferably, according to this embodiment, the cheese product does not comprise any additive chosen from melting salts and texturizing agents (emulsifiers and thickeners).

The cheese product obtained may also comprise one or more manufacturing auxiliaries (in particular at least one salt), one or more additives including antioxidants, one or more micronutrients, microalgae (such as, for example, *chlorella* and *spirulina*), and vitamin(s) (such as, for example, vitamin A, B, C and/or D), minerals (such as, for example: calcium, potassium, magnesium, zinc, iron, iodine, copper, selenium, manganese, etc.), at least one acid, for example lactic acid, and/or formed elements (for example garlic, parsley, pepper, shallot, caraway, nut or almond chips, hazelnuts, olives, herbs, vegetable chips or fruit).

This cheese product may typically be obtained by the manufacturing method according to the invention. According to a particular embodiment, said cheese product may be pressed cheese, as defined above.

In a particular embodiment, the diameter of at least 50% of the fat globules in the cheese product is less than or equal to 1.5 µm, preferably less than 1 µm, and in that the mean diameter of the fat globules in the cheese product is less than or equal to 1.5 µm, preferably less than 1 µm. The diameter and average diameter of the fat globules in the cheese product are measured by confocal laser scanning microscopy (CLSM).

According to one particular embodiment of the invention, this cheese product has a solids content of 25 to 60%, preferably 45 to 60% by weight relative to the total weight of the cheese product.

According to one particular embodiment of the invention, the cheese product has a solids content of from 25 to 60% by weight relative to the total weight of the cheese product, preferably from 45 to 60% by weight relative to the total weight of the cheese product. In a particular embodiment, the cheese product produced by the method according to the invention meets the definition of products known as "healthy snacks" (HS) according to the FDA (Food and Drug Administration), detailed in the table below.

TABLE 1

| FDA Healthy snack standards | |
| --- | --- |
| Compound | "Healthy standard" of FDA for 100 g |
| Fat | ≤6 g |
| Of which saturated | ≤2 g |
| Cholesterol | ≤400 mg |
| Sodium | ≤960 mg |
| Calcium | ≤333 mg |
| Proteins | ≥17 g |

According to one embodiment of the invention, the cheese product has a carbohydrate content of less than or equal to 5% by weight relative to the total weight of the cheese product, preferably less than or equal to 1%, advantageously less than or equal to 0.1% after lactic acidification.

The term "carbohydrates" means any organic compounds containing a carbonyl group (aldehyde or ketone) and at least two hydroxyl groups (—OH). Included in this class are substances derived from monosaccharides by reduction of the carbonyl group, by oxidation of at least one functional group at the end of the carboxylic acid chain or by replacement of one or more hydroxyl groups with an atom of hydrogen, an amino group, a thiol group or any similar atom. In particular, the term carbohydrate includes monosaccharides such as glucose, galactose or fructose and disaccharides such as sucrose, lactose or maltose, polymers of oses (oligosaccharides and polysaccharides).

According to one embodiment of the invention, the cheese product has a lactose content of less than 1% by weight relative to the total weight of the cheese product, preferably less than or equal to 0.5%, advantageously less than or equal to 0.1%.

According to a preferred embodiment of the invention, the cheese product comprises 0.15 to 0.5% fat and 0% carbohydrates by weight relative to the total weight of the cheese product. Such a product may be called "double 0" in some cases. Until now and to our knowledge, no cheese or specialty cheese on the market can satisfy the claim "0% fat and carbohydrates".

The "double 0" product is obtained from raw material skimmed and without added fat. Carbohydrates naturally present in dairy raw materials (mainly lactose) are entirely consumed by lactic ferments in these formulations.

"Double 0" formulations include:
A milk protein concentrate (MPC) whose protein content is greater than 60% with a reduced carbohydrate content of less than 10% by weight relative to the total weight of the mixture.

The consumption of the lactose present in the formulation is carried out by the action of lactic ferments (the lactic ferments used are chosen from the group consisting of mesophilic and/or thermophilic fermentation agents, in particular bacteria of the genus *Lactobacillus* or *Streptococcus*); specifically chosen for the aromatic contribution. The result is a tasty product with no residual sugar.

The pH of the cheese product of the invention is advantageously between 5.0 and 5.6.

According to one embodiment, the cheese product is in the form of a portion of 20 to 30 g.

Throughout this application, the term "comprising" should be understood to encompass all the features specifically mentioned, as well as optional, additional, or non-expressly described features. The term "comprising" also discloses the embodiment in which no features other than the specifically mentioned features are present (i.e. "comprising" in the sense of "consisting of").

The invention is also illustrated by the following figures and examples which do not limit the scope thereof.

FIGURES

FIG. 1: Confocal laser scanning microscope observations (×63 magnification) of a cheese product without added fat, comprising 0.5% fat by weight relative to the total weight of the cheese product. The fat globules are colored, they appear here in black.

Figure 2:
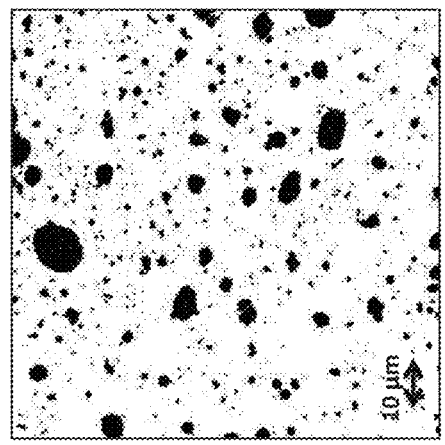
Figure 2:
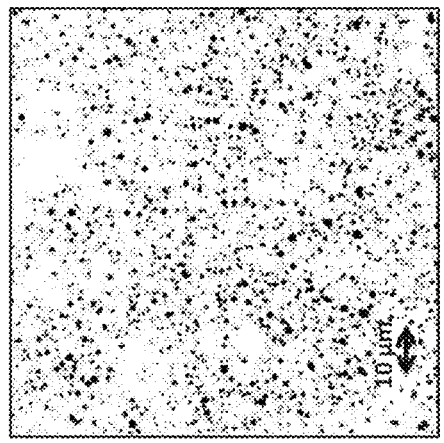

FIG. 2: Confocal scanning laser microscope observations (×63 magnification) of a cheese product comprising 4% animal fat by weight relative to the total weight of the cheese product (left) in comparison with a product of the soft-type comprising 5% fat by weight relative to the total weight of the cheese product (right).

Figure 3:
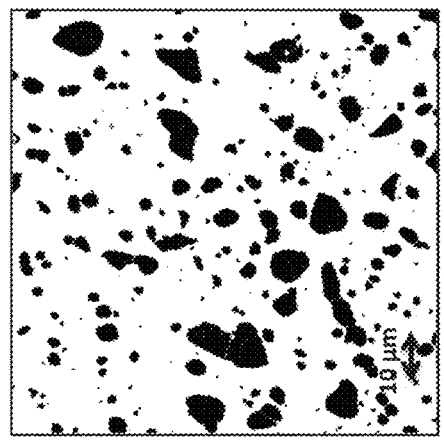
Figure 3:
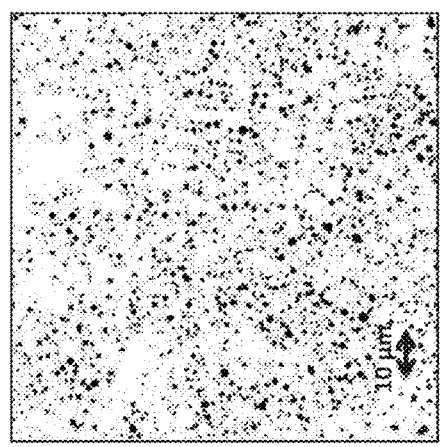

FIG. 3: Confocal scanning laser microscope observations (×63 magnification) of a cheese product comprising 4% animal fat by weight relative to the total weight of the cheese product (left) in comparison with a product of the pressed cheese type comprising 10.3% fat by weight relative to the total weight of the cheese product (right).

Figure 4:
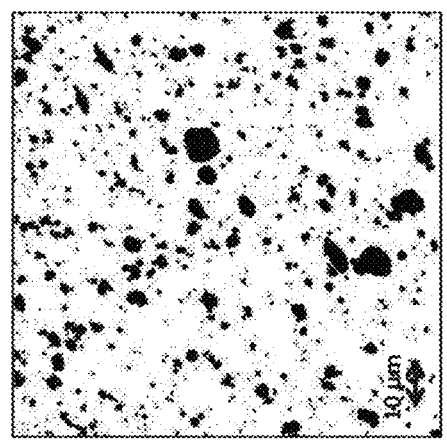
Figure 4:
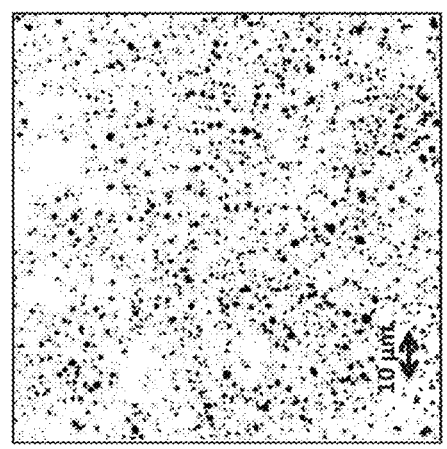

FIG. 4: Confocal scanning laser microscope observations (×63 magnification) of a cheese product comprising 4% animal fat by weight relative to the total weight of the cheese product (left) in comparison with a soft cheese product comprising 9% fat by weight relative to the total weight of the cheese product (right).

Figure 5:
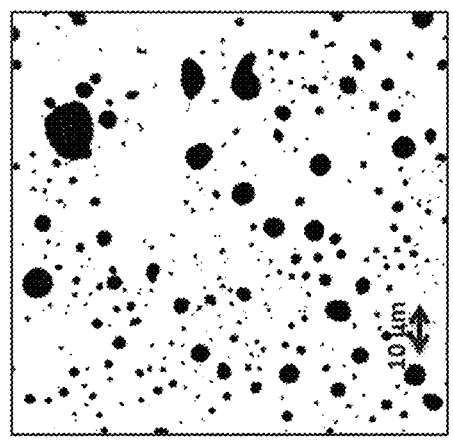
Figure 5:
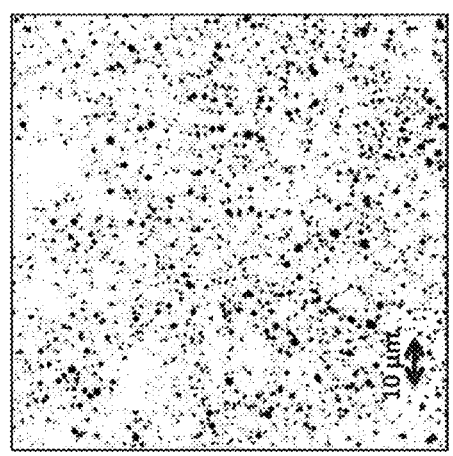

FIG. 5: Confocal scanning laser microscope observations (×63 magnification) of a cheese product comprising 4% animal fat by weight relative to the total weight of the cheese product (left) in comparison with a pressed cheese product comprising 17% fat by weight relative to the total weight of the cheese product (right).

Figure 6:
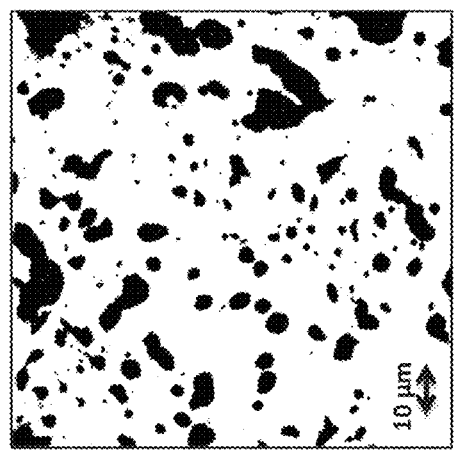
Figure 6:
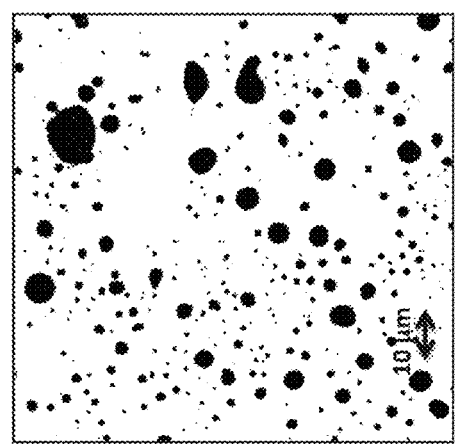

FIG. 6: Confocal laser scanning microscope observations (×63 magnification) of a cheese product comprising 17% fat on the purchase (left) and 2 months after ripening (right).

Figure 7:
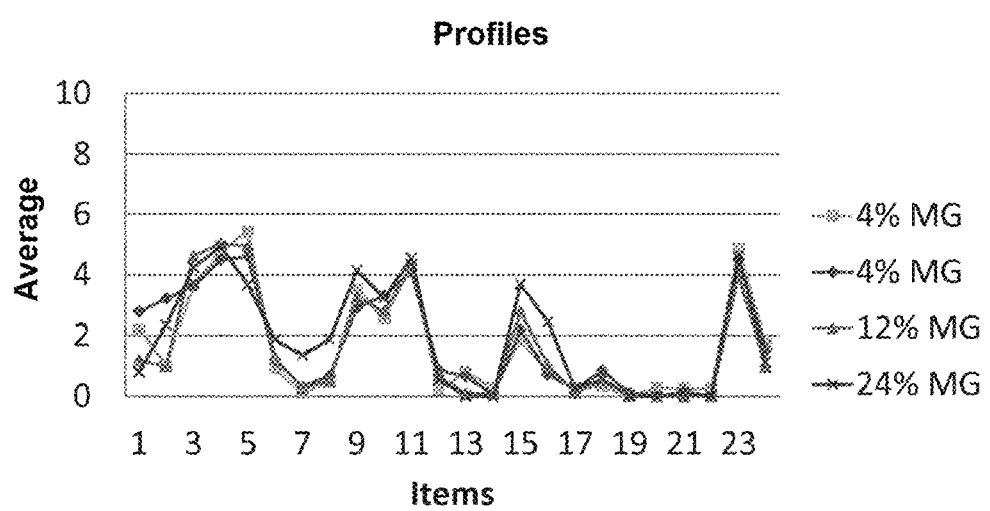

FIG. 7: Sensory profiles obtained on 24 descriptors by an expert jury.

EXAMPLES

Example 1

Formulation comprising 4% animal fat by weight relative to the total weight of the cheese product

TABLE 2

Composition of the mixture

| Ingredients | Weight percentage |
| --- | --- |
| MPC (at 1.5% fat material) | 30.6 |
| Skim milk powder (lactose) | 1.5 |
| Butter | 4.3 |
| Water | Q.S.P 100% |
| Ferments | 0.9 |
| Rennet | 0.4 |
| Salt | 0.6 |

Protocol:

In a mixing or recombination device, incorporating the ingredients as follows: water, butter, MPC and lactose. Mixing and heating at a shear rate of between 20,000 and 25,000 and at a temperature between 55 and 65° C. for a minimum of 20 min to obtain a homogeneous mixture. Then thermizing the mixture by heating and cooling. Injecting a coagulating agent into the mixture and distributing the mixture containing the coagulating agent in molds by dosing. The coagulation is between 15 and 50° C., then the cheese product is cooled and packaged.

Example 2

Formulation Comprising 0% Added Fat

TABLE 3

Composition of the mixture

| Ingredients | Weight percentage |
| --- | --- |
| MPC | 30.9 |
| Skim milk powder (lactose) | 1.6 |
| Butter | 0 |
| Water | Q.S.P 100% |
| Ferments | 0.9 |
| Rennet | 0.4 |
| Salt | 0.6 |

Protocol:

In a mixing or recombination device, incorporating the ingredients as follows: water, MPC and lactose. Mixing and heating with a shear of 10,000 to 15,000 and at a temperature between 60 and 70° C. for a minimum of 20 min, to obtain a homogeneous mixture. Then thermizing the mixture by heating and cooling. Injecting a coagulating agent into the mixture and distributing the mixture containing the coagulating agent in molds by dosing. The coagulation is between 15 and 50° C., then the cheese product is cooled and packaged.

Example 3: Confocal Imaging of the Cheese Products Obtained

1. Protocol

A thin slice of the sample is laid on a flat blade. Place 4 μL of markers in the center of the sample and fix the assembly with a coverslip. The markers are chosen according to their ability to focus on the particular sites of a structure of interest and diffuse into the matrix; in particular, the markers used are as follows:

Alexa Fluor 488 for protein identification (green)
Bodipy 665 for the characterization of fat (red)

The sample after marking for a minimum of 2 h is placed on a LSM700 Zeiss laser scanning confocal microscope, equipped with the ×63 objective, and is impacted by an exciter laser beam in response to which it will emit light rays from different planes. The reflected rays are filtered by the microscope according to their wavelength and detected by photomultipliers. The choice of the wavelengths of the Alexa 488 and Bodipy 665 fluorochromes is carried out in order to obtain distinct and separate peaks and consequently to give a cleaner image.

Computer processing is performed using ImageJ software. ImageJ is a multiplatform, open source image processing and analysis software developed by the National Institutes of Health. In image analysis, ImageJ makes it possible, for example, to count particles, to evaluate their aspect ratio, to measure various quantities (distances, surfaces), to extract contour coordinates.

2. Results

As shown in FIG. 1, for a cheese product without the addition of fat material (0.5% of fat material by weight relative to the total weight of the cheese product), confocal image processing with the ImageJ software shows a mean diameter of the fat globules in the cheese product of 0.5 μm, less than 1 μm.

As shown in FIGS. 2 to 5, the fat content (MG) of the cheese product obtained by the method according to the invention (HS) is in globular and fine form, distributed more homogeneously than in a commercial soft cheese product. The fat globules are covered with an interface of protein material. The average diameter of the fat globules in the cheese product is 0.783 μm, less than 1 μm. The commercial product at 5% MG (FIG. 2) does not have the same structure as the cheese products obtained by the method according to the invention (HS), as well as the products with 10.3% MG (FIG. 3), 9% MG (FIG. 4) or 17% MG (FIG. 5). The distribution of MG is not homogeneous.

Example 4: Grain Size Measurements of the Cheese Products Obtained

In addition, granulometry measurements were carried out on the cheese products obtained by the method according to the invention (HS) at different ages.

1. Protocol

Case of a Cheese

A 0.5 g sample of cheese is taken and then immersed in 4.5 g of dissociation solution (10% dilution) designed to dissociate the protein matrix and stabilize the fat globules of the sample, then placed under agitation for at least 2 hours at 230 rpm. The products are left standing overnight if necessary to ensure complete dissociation of the matrix and stirred 10 min before the granulomertry analysis.

The sample is then placed in the dispersion cell of a Malvern-Mastersizer 2000 laser granulometer. This device measures the particle size distributions by measuring the angular variation of scattered light intensity as a laser beam passes through the particles scattered in the sample. The particle size distributions are directly communicated by the granulometer.

Case of a viscous liquid mixture

The same protocol is used.

2. Results

On the data obtained by particle size measurements, the d(0.5) indicates that 50% of the volume of the fat is in the form of droplets whose diameter is smaller than this particle diameter expressed in microns. AMF stands for anhydrous milk fat.

TABLE 4

Result of granulometric measurements

| Date of analysis | Product code | Product | d(0.5) in μm |
| --- | --- | --- | --- |
| 23/05/2016 | 16-140 | 4% butter | 0.664 |
| 19/05/2016 | 16-138 | 4% AMF | 0.746 |
| 24/11/2016 | 16-140 | 4% butter | 0.800 |
| 24/11/2016 | 16-138 | 4% AMF | 0.709 |

More than 50% of the particles have a diameter of less than 1 μm. This is also true after 6 months of storage. Fat globules do not coalesce during ripening because they are very well stabilized by the very rich casein interface.

As shown in FIG. 6, in the commercial product at 17% fat, far fewer fat globules are intact after two months of ripening. MG is in coalesced form.

Example 5: Sensory Tests

Two tests were conducted to demonstrate the proximity of the organoleptic qualities of the cheese products obtained by the method according to the invention (HS) with the organoleptic qualities of pressed cheese:

A first test to evaluate with an expert jury according to a list of descriptors, defined beforehand for the firm cheese universe, 4 products with different fat content.

A second test to classify different pasta pressed by naive subjects, including cheese products obtained by the method according to the invention (HS) according to a list of organoleptic descriptors obtained through a first step of free sorting.

1. QDA Descriptive Profile by Expert Jury

The expert jury meets the French standard NF ISO 8586-1 and the premises used for all evaluations to the NF EN ISO 8589 standard.

The QDA descriptive profile corresponds to a Qualification on 24 descriptors and a quantification on a continuous scale of intensity from 0 to 10. The descriptors are descriptors of appearance, texture in the mouth, flavors and aromas.

Each product is pre-anonymized and portioned before being presented in a monadic sequential manner, the temperature of the products during the tasting being 14-15° C.

QDA descriptive profiles were performed on:
very low fat products, Healthy snack 4% butter (total fat) at two different ages,
fat-reduced products of the same technology at 12% fat content,
products not lightened or "full fat" to 24% of MG of the same technology.

The profiles obtained are shown in FIG. 7.

The profiles of the 4% and 12% fat products are sensorially close to each other for many descriptors and for the 2 ages of the very light products.

Products with a very low level of MG of less than or equal to 5% may be considered as equivalent to a standard fat-reduced product.

The profile of a full fat product (24%) stands out for many descriptors.

2. Ranking Test 14 naive judges participated in the ranking tests. Each judge must rank the 13 products on each given descriptor, these descriptors having been defined after a first free sorting test. These are the descriptors most cited in the phase of free sorting, and therefore the most likely to screen the products, which have been selected.

The ranking is done according to the intensity perceived for each sensation. Ex-aequo were allowed.

Each product has been previously anonymised and portioned. The products were presented simultaneously. The temperature of the products during the tasting was 14-15° C.

TABLE 4

Fat content of the products presented in the classification test

| | MG rate (%) |
| --- | --- |
| 1 | 0.5 (by analysis) |
| 2 | 0.5 (by analysis) |
| 3 | 4.5 (by analysis) |
| 4 | 4 (by analysis) |
| 5 | 4 (by analysis) |
| 6 | 12 (by analysis) |
| 7 | 11 (pack indication) |
| 8 | 17 (pack indication) |
| 9 | 14 (pack indication) |
| 10 | 16.5 (indication pack) |
| 11 | 24.5 (pack indication) |
| 12 | 23 (pack indication) |
| 13 | 29 (pack indication) |

The very low-fat products (MG less than or equal to 5%) are the products numbered 1 to 5, the others are commercial products of the type PPC (cured pressed cheese) or uncured PPNC (uncured pressed cheese) (products numbered 6 to 10) or not (products numbered 11 to 13).

The products were ranked by the judges on a continuous scale from 0 to 10 and the sum of the ranks ranked according to the intensity perceived by the judges on the list of descriptors.

An analysis of the variance was performed on the ranks assigned by the judges, for each descriptor. There was no averaging of ranks. Significance is set at 5%. The results of this analysis of variance were then subjected to an average comparison test (TUKEY test).

The following table shows the results of this test. Each value indicated in each box located at the intersection of a "descriptor" column and a "sample" line is constituted by the sum of the ranks attributed by the members of the jury to the sample for the descriptor considered. The letters for their part indicate the association of each sample, for a descriptor in question, to a "family" within which the products are not significantly different with respect to said descriptor; two samples presenting, for a given descriptor, a common letter are thus considered not to be significantly different.

TABLE 5

Mean Comparison test results (TUKEY Test)

| Sample | Elastic | Melting | Acid | Cream | Cheese-maker |
| --- | --- | --- | --- | --- | --- |
| 1 | 127 DE | 113.5 BCD | 85 AB | 55 AB | 41.5 A |
| 2 | 144.5 E | 86.5 ABCD | 67.5 A | 47.5 A | 48 AB |
| 3 | 121.5 CDE | 105 BCD | 70.5 A | 87 BCDE | 54.5 AB |

TABLE 5-continued

Mean Comparison test results (TUKEY Test)

| Sample | Elastic | Melting | Acid | Cream | Cheese-maker |
|---|---|---|---|---|---|
| 4 | 113 BCDE | 108 BCD | 98 ABCD | 76 ABCD | 84.5 BC |
| 5 | 129 DE | 124 CD | 79.5 AB | 73.5 ABC | 57 AB |
| 6 | 79 AB | 110.5 BCD | 75.5 AB | 85.5 ABCDE | 83 B |
| 7 | 83.5 ABC | 94 ABCD | 134.5 D | 114 DEF | 82.5 B |
| 8 | 69.5 A | 62 A | 115 BCD | 103.5 CDEF | 154 D |
| 9 | 98 ABCD | 57.5 A | 101 ABCD | 101 CDEF | 148.5 D |
| 10 | 95.5 ABCD | 85 ABC | 138 D | 116.5 EF | 124 CD |
| 11 | 81.5 ABC | 122 CD | 93.5 ABC | 129 D | 148.5 D |
| 12 | 67 A | 125.5 D | 125.5 CD | 121.5 EF | 88 BC |
| 13 | 65 A | 80.5 AB | 90.5 ABC | 73 ABC | 160 D |

In the column "elastic" the products belonging to the family "D", in the column "melting" the products belonging to the family "D", in the column "acid" the products belonging to the family "A", in the column "cream" the products belonging to the family "B", and in the column "cheese-maker" the products belonging to the family "B" appear in bold. The inventors find that, apart from the "elastic" and "melting" descriptors, there is no family specific to highly fat-reduced products. However, even for these descriptors, products with a very low fat content are most often also classified with firm cheese products and low-fat products. Highly fat-reduced products are therefore not perceived to be significantly different from fat-reduced or non-fat-reduced products.

The very light products are classified as the least creamy. There is a link between the MG rate and the perception of the cream score. However, they are not significantly different from low-fat products. On the basis of the descriptors considered as relevant or central (because generated by free sorting) to describe the range of pressed cheeses, there is no significant or systematic difference between the fat-reduced and highly fat-reduced products.

3. Comparison with Other Product Universes–Qualitative Qualities

Comparisons of profiles between low-fat products and non-fat-reduced (or "full fat") products from the same or other technologies were made by an expert jury:

Low-fat products are described as more floury, more oxidized, bitter, rancid and cardboard-like. These characteristics affect the organoleptic qualities of the product for the consumer.

For an ultra-fat-reduced product such as Healthy Snack (MG level <5%), these organoleptic defects have not been identified in the sensory profiles in relation to products with a higher MG content of the same technology: it is a significant advantage of this method.

The invention claimed is:

1. Method for manufacturing a cheese product whose fat content is 0.15-5% by weight relative to the total weight of the cheese product, and said cheese product having a moisture content on a fat-free basis (MFFB) from 60 to 75%, said method comprising the following steps:
   a) in a mixing or recombination device, mixing and heating at a temperature of 40 to 85° C., with a shear of 5,000 to 40,000 s$^{-1}$, a mixture comprising water, and at least one protein material in sufficient quantity so that protein content represents 10 to 35% by weight relative to the total weight of the mixture, said protein material comprising at least one dairy-derived protein material, the mixture comprising from 0.15 to 5% fat by weight relative to the total weight of the mixture, so as to obtain a homogeneous mixture;
   b) thermizing the mixture by heating, then cooling it;
   c) injecting into the mixture at least one coagulating agent;
   d) dosing the mixture containing the coagulant into molds;
   e) coagulating between 15 and 50° C.;
   f) cooling down; and
   g) packaging the cheese product,
wherein the cheese product is free of texturizing agent.

2. Method according to claim 1, wherein step a) comprises addition of fat.

3. Method according to claim 1, wherein said cheese product is wherein diameter of at least 50% of fat globules in the cheese product is less than or equal to 1.5 μm, and wherein average diameter of the fat globules in the cheese product is less than or equal to 1.5 μm.

4. Method according to claim 1, wherein said cheese product has a solids content of 25 to 60% by weight relative to the total weight of the cheese product.

5. Method according to claim 2, wherein said added fat is of animal origin, of plant origin or is a mixture of animal and plant fats.

6. Method according to claim 1, wherein the method does not include the use of melting salt(s) and texturizing agent(s).

7. Method according to claim 1 wherein said at least one dairy-derived protein material is selected from the group consisting of whole milk powder, skimmed milk powder, caseins, caseinates, milk protein concentrates, serum protein concentrates, fresh or refined cheeses, curds, yoghurts, fermented milks, and a mixture of these dairy-derived protein materials.

8. Method according to claim 1, wherein the mixture of step a) comprises at most 1 to 20% lactose by weight relative to the total weight of the mixture.

9. Method according to claim 1, wherein said cheese product is wherein diameter of at least 50% of fat globules in the cheese product is less than or equal to 1 μm, and wherein average diameter of the fat globules in the cheese product is less than or equal to 1 μm.

10. Method according to claim 1, wherein said cheese product has a solids content of 45 to 60% by weight relative to the total weight of the cheese product.

11. Method according to claim 2, wherein said cheese product is wherein diameter of at least 50% of fat globules in the cheese product is less than or equal to 1.5 μm, and wherein average diameter of the fat globules in the cheese product is less than or equal to 1.5 μm.

* * * * *